United States Patent [19]
Knestel

[11] Patent Number: 5,781,286
[45] Date of Patent: Jul. 14, 1998

[54] METHOD AND APPARATUS FOR MEASUREMENT OF AXLE AND WHEEL POSITIONS OF MOTOR VEHICLES

[75] Inventor: Anton Knestel, Hopferbach, Germany

[73] Assignee: Knestel Electronik GmbH, Germany

[21] Appl. No.: 633,153

[22] Filed: Apr. 16, 1996

[30] Foreign Application Priority Data

Nov. 14, 1995 [EP] European Pat. Off. ............. 95117953

[51] Int. Cl.[6] ........................ G01B 11/26; G01B 5/24
[52] U.S. Cl. ................... 356/139.09; 33/203.18; 33/288
[58] Field of Search ................. 356/139.09; 73/146; 33/203.18, 336, 288

[56] References Cited

U.S. PATENT DOCUMENTS

| 5,018,853 | 5/1991 | Hechel et al. ................ 356/155 |
| 5,519,488 | 5/1996 | Dale, Jr. et al. ............. 356/139.09 |
| 5,561,244 | 10/1996 | Olesky et al. ............... 73/146 |

FOREIGN PATENT DOCUMENTS

| 0053065 | 6/1982 | European Pat. Off. ...... G01B 11/275 |
| 2313087 | 9/1973 | Germany ..................... G01B 7/30 |
| 2841844 | 4/1979 | Germany ..................... G01B 21/26 |
| 2855781 | 6/1979 | Germany ..................... F02D 37/02 |
| 3531459 | 3/1986 | Germany ..................... B62D 17/00 |
| 3904557 | 8/1990 | Germany ..................... G01B 11/275 |

*Primary Examiner*—Mark Hellner
*Attorney, Agent, or Firm*—Baker, Maxham, Jester & Meador

[57] ABSTRACT

A method and an apparatus for measuring the wheel positions of double-track motor vehicles according to which the relevant wheel angles, such as the track, the king pin inclination, the inclination of the steering knuckle pivot, the axle pin rake, the eccentricity or the like, are detected by means of measuring heads mounted on the wheel rims of the vehicle wheels. The measurement data is evaluated and displayed by a processing means. The measuring heads are pivotable around an extension of the axis of rotation of the respectively related vehicle wheel. To be able to carry out measurements even with the vehicle wheels rotating, the measuring heads are held in their predetermined measuring position by means of a position control. The measuring heads contain inclinometers and/or electro-optical measuring cells for detecting the measuring data which are suitable for detecting the eccentricity, the axle pin rake, the track difference angle and the like, in addition to detecting the king pin inclination and track angles.

25 Claims, 7 Drawing Sheets

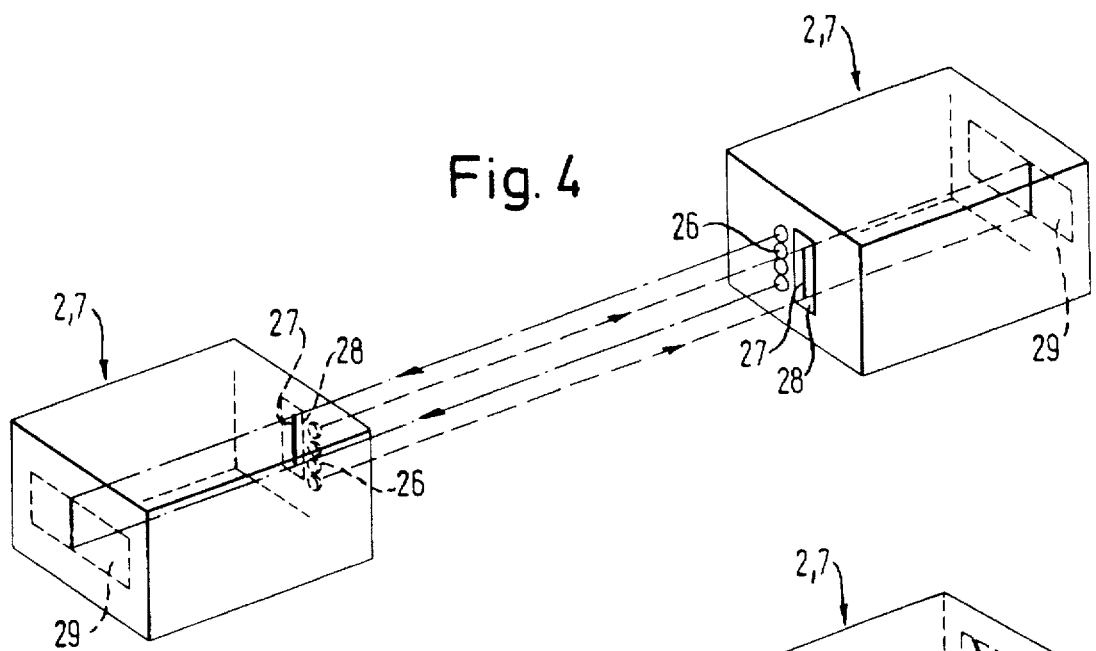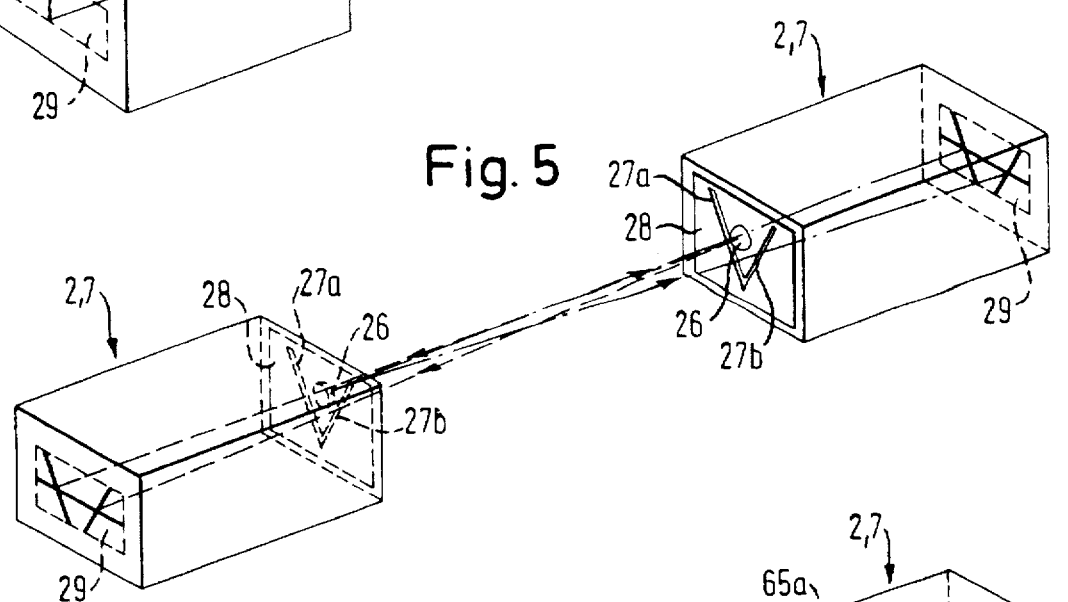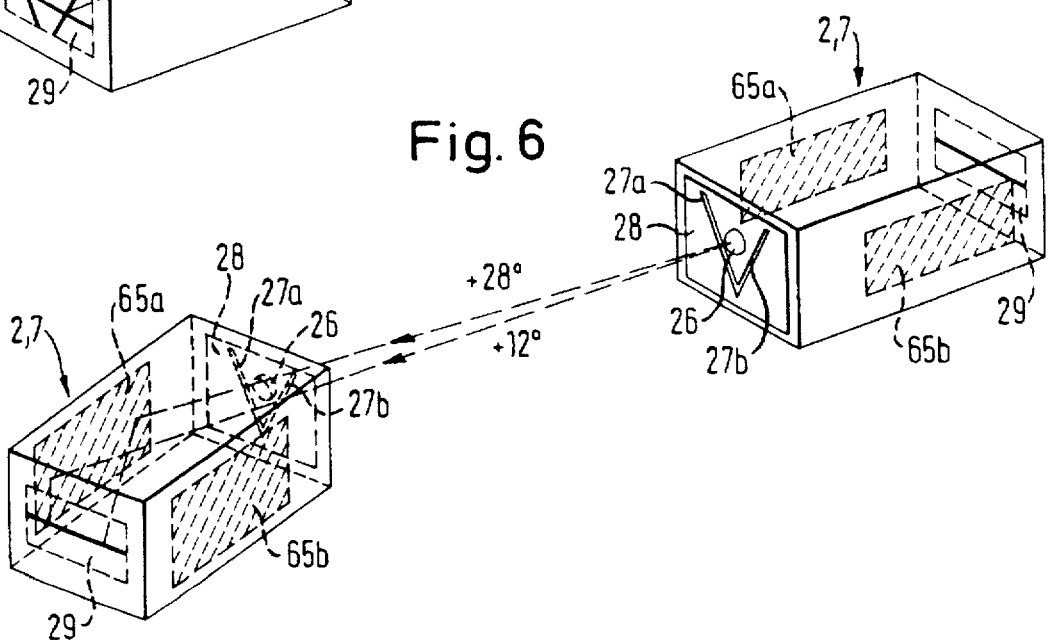

METHOD AND APPARATUS FOR MEASUREMENT OF AXLE AND WHEEL POSITIONS OF MOTOR VEHICLES

BACKGROUND

1. Field of the Invention

The invention relates to methods and devices for the measurement of the axle and wheel positions of double track motor vehicles for determining, among other things, the track, the king pin inclination, the inclination of the steering knuckle pivot, the axle pin rake, and the like.

2. Discussion of the Related Art

Such measuring methods and devices have been known for a long time in multiple embodiments and are used by motor vehicle manufacturers as well as in the legally prescribed checks of motor vehicles and in maintenance and repair companies for ensuring the driving characteristics of the motor vehicle.

In German patent 2,841,844, a generic method is described by means of which the king pin inclination and the track can be measured in a relatively simple way by means of two sensors pivotably borne on an axis centered shaft. On a holding device mountable on the outside of a wheel rim a measuring head is borne, freely rotatable, on a shaft which can be centered with respect to the axle tree. The measuring head contains two inclination sensors and is, at least approximately, held in its predetermined measuring and spatial position by its dead weight even after the wheel of the motor vehicle has been rotated by predetermined angles of, for example, 90° and 180°. Two different types of sensors are used, namely, a gravitation-sensitive sensor for the king pin inclination, and further, an electro-optical track sensor fixed to the free end of a horizontally aligned measuring arm projecting beyond the circumference of the wheel. The measuring heads allocated to each wheel of the motor vehicle are connected to a stationary control unit, the microprocessor of which calculates the angle values for the king pin inclination and the track from the output signals of the different sensors while compensating for the deflection errors or wobbling due to an inaccurate alignment of the measuring head shaft with respect to the wheel axle. For the vehicle standing on a pavement or on drivable pairs of rollers, three measurements are required for a complete measuring operation, respectively, the second and third measurement being carried out after a defined rotation of the vehicle wheel by 180° and 90°, respectively.

From German patent 3,904,557, a device for measuring the wheel positions of double-track motor vehicles is known, in which a measuring head is fixed to the wheel rim of each vehicle wheel by means of a holding device which can be centered with respect to the axle. Each measuring head contains, as a measuring element for the vertical angles, a so called electro-optical inclinometer provided with a pendulum suspended in a freely movable way and having a light source attached therein for generating a vertical beam of light and, as a receiving means, a line sensor formed as a CCD-line. For measuring the horizontal angles, a light source separate from the measuring head is provided, the horizontal light beams of which are also on the CCD-line. An electronic control means coupled to the measuring heads of all vehicle wheels via cables or in a contact-free way, for example by radio transmission, pulses the two light sources in a time-dependent sequence, so that the vertical as well as the horizontal angles can be detected by only one sensor line, respectively.

Further, from the European patent application 0,053,065, an apparatus for measuring the wheel positions of double-track motor vehicles is known, in which a light source and a lens system are provided within a measuring arm, which is adjustably fixed to a holding device mounted on the vehicle wheel via a vertical supporting plate and a transverse bolt. The arm extending horizontally and parallel to the plane of the wheel is telescopically formed and supports a mirror, which is inclined by 45°, and a slit stop, as well as a measuring plate including scales on the free end of its inner shiftable arm portion. By extending and retracting the telescope arm, this device can be adjusted to wheels of different sizes in a simple manner.

During the installation of the measuring heads on the vehicle wheels or their wheel rims usually angle errors between the plane of the vehicle wheel and the plane of the measuring head are caused, for example, due to an eccentricity of the wheel rim, which lead to an eccentricity and therefore to erroneous results of the following measurements of the track and the king pin inclination when the wheel is rotated. In the above-mentioned German patent 2,841,844, and also in German patent publication 2,313,087, methods are described according to which the vehicle wheel, or also the measuring head, are manually turned and the resulting lateral deflections in each of these angular positions are stored in a control unit by pressing a key. Based on those stored data then a correction of the measured angles of the track and the king pin inclination is effected. A similar method is described in German patent publication 2,855,781, wherein the king pin inclination is continuously detected during a 360° rotation of the wheel, and a correction value considering the eccentricity is determined from the stored maximum and minimum values.

According to almost all known methods and devices for measuring wheel positions of motor vehicles it is necessary to lift the respective motor vehicle, for example, by means of a lifting platform engaging on the chassis, to be able to rotate the thereby disengaged vehicle wheels freely. It is commonly known that in modern comfortable motor vehicles having a relatively soft wheel suspension, after any lifting and releasing of the wheel resilience systems followed by setting the vehicle down onto the pavement, an erroneous alignment of the components, particularly the vehicle wheels, is effected, which only return to their initial positions after running for several kilometers. In addition to the greater efforts involved due to the required lifting of the motor vehicle therefore, with these conventional methods, measuring errors are caused depending on the respective wheel suspension system and its working order. For measuring the horizontal angles, particularly the track angles, optical measuring systems are generally used, which may be provided with successively accessed transmitting elements as well as one or more receiving elements which are, if necessary, in a timed relation, accessed by the transmitting elements (see German patent publication 3,531,459).

Finally, from the German patent 3,904,557 a system is known with which, by means of a single optical sensor including several receiving elements arranged adjacent to each other and light emitting elements activated in a timed relation, the angles of the track and the king pin inclination are detected. The angles for the track and the king pin inclination however, must be measured sequentially, whereby the speed of the system is decreased. A built-in freely movable pendulum is provided with a light source and forms an inclination sensor sensitive to gravitation.

In devices for measuring wheel positions having no external reference system, floating plates must be placed under the wheels to be measured to avoid measuring errors. This is realized by so called rotary plates, particularly at the steerable front axle. As a rule, the plates are freely movable in the X and Y directions, the third degree of freedom being the rotatability of the plate. This is used in the measurement of the axle to determine the maximum cramp angle as well as for measuring the track difference angle. For this purpose, the difference between the angle of the wheel on the inner side of the curve and the angle of the wheel on the outer side of the curve is determined at a steering angle of 20°. This is carried out in both steering directions. Then the inclination of the steering knuckle pivot and the axle pin rake are also measured and computed at a steering angle of 20°. For this purpose, according to the state of the art, the rotary plate is provided with a sensor, by means of which the steering angle can be measured relative to a steering angle of 0° (straight driving). In this case, the sensor must be guided and held relative to the rotary plate by means of a coordinate system. This goes along with accordingly high mechanical requirements, and the result of the measurements may be effected by slackness of the guides.

SUMMARY OF THE INVENTION

It is an object of the invention to provide methods and devices for measuring the axle and wheel positions of multiple track motor vehicles, by means of which the different wheel angles, particularly also the eccentricity, may be continuously detected with high accuracy without manual operations and/or settings as well as without lifting the vehicle or its wheels.

According to the invention, the measuring heads are held by a specially formed position control during the driving operation so that the positions of angle sensors for the track and the king pin inclination are not affected by the rotary motion of the wheel, and are thus able to function properly. To this end, a rotational speed equal to the rotational speed of the vehicle wheels but of the opposed direction is imposed on the measuring heads, so that each of the measuring heads accurately maintains its predetermined position during the complete measuring operation.

According to a suitable embodiment of the invention, a stepping motor is used for the control of the position of the measuring head, and the tumbling angles of the king pin inclination or the track are measured and electronically stored for each individual step of the motor. According to another embodiment of the invention, a dc motor is used for the control of the position of the measuring head, in which case the feedback of the current actual position corresponding to the individual steps of the stepping motor may be effected by an increment transmitter. A so called inclinometer may be advantageously used as a sensor element for the control of the position of the measuring head, which inclinometer will also be used as a signal transmitter for the measurements of the inclination of the steering knuckle pivot and the axle pin rake. During a rotation of the wheel on a pavement or also on driven pairs of rollers, the alignment and the position of the respective measuring heads are detected by means of the inclinometers used, and these measuring values are compared with target values in a computer, the control of the respective stepping motor being effected based on the obtained deviation with respect to zero.

When measuring a four-wheel motor vehicle, the tumbling angles are automatically detected simultaneously by all four measuring heads during a (relatively slow) driving movement on the floor of the workshop. Instead of carrying out the measurements during a driving movement on the floor of the workshop or on another pavement, they can as well be carried out using pairs of rollers with one wheel standing on a driven pair of rollers, respectively. In this case too, the measuring heads of the wheels to be checked are being held in their predetermined measuring positions by the position control. To eliminate detrimental lateral forces acting on the wheel suspension, if necessary, the measurements may as well be effected on a shiftable plate being movably borne in a direction transverse to the driving direction, a reflex light barrier being suitably allocated to each measuring head of an axle, which reflex light barrier detects a reflecting strip provided on the start of the shiftable plate while the vehicle is run over the same, thus starting the measurement of the eccentricity. If the measurement of the eccentricity is effected on a rising or sloping portion of pavement, the inclined position of the vehicle thus effected may be measured by a reference sensor being releasably, for example, magnetically, attached to the vehicle. The angle of inclination detected by the reference sensor is considered by the position control which thus maintains the measuring heads parallel to the pitch axis of the vehicle.

According to another aspect of the invention, special opto-electrical measuring cells are suggested which are particularly suitable for usage in the new measuring apparatus, but may also be used for other measuring devices for motor vehicle wheels. Each of these measuring cells contains multiple light receiving elements or line sensors arranged in a transverse plane and accommodated in a housing, which light receiving elements or line sensors receive light beams from an allocated second measuring cell and one or more cyclically activated light sources generating the light beams for the light receiving elements of the second measuring cell. In the light path, a line forming element, for example, in the form of a slit stop, is formed in a predetermined distance to the transverse plane of the respective line sensors, which line forming element may be provided with only a single or as well more slits preferably being inclined with respect to each other in an acute angle. Particularly by providing two inclined slits in the slit stop, the complete measuring operation may be considerably shortened and simplified as the angles of the track and the king pin inclination may be detected and calculated by the same measuring sensor, and also these measuring cells alone are required for the position control of the respective measuring head. The range of application of these measuring sensors may be extended, for example, for the measurement of the turning angle of the steering wheel or of the contact surfaces of rotary plates, by reflectorizing, at least partly, the inner surface of the sensor housing. This embodiment enables, among other things, the measurement of the track difference angle, i.e., the angle between the wheel on the inner side of the curve and the wheel on the outer side of the curve necessarily existing at a predetermined wheel position of, for example, 20°, with respect to the longitudinal axis. For this purpose, the motor vehicle is driven onto rotary plates with the two wheels to be measured, which rotary plates are freely shiftable in the horizontal plane, i.e., are floating borne and turnable around a vertical axis. After positioning the wheels on the rotary plates, the two rotary plates with the vehicle wheels located on them are turned by the predetermined steering angle, for example, 20°, the steering angle being determined for the vehicle wheel on the inner side of the curve. As the measuring head mounted on the vehicle wheel takes part in this turning movement, the light beams emitted by the measuring head of the vehicle wheel on the other axle approximately parallel to the vehicle axle enter the housing with this angle of inclination or steering angle and are reflected by one of the reflective or mirrored side walls so that the line sensor provided on the rear end of the housing is illuminated at a certain position and generates the output signals corresponding to the steering angle. After determining the predetermined steering angle and, if necessary, fixing the rotary tables in that position, the angle of inclination of the vehicle wheel on the outer side of the curve is determined by effecting a corresponding measuring operation on the same. A subtraction of the steering angle of the vehicle wheel on the inner side of the curve from this determined (always slightly larger) angle of inclination of the vehicle wheel on the outer side of the curve provides the track difference angle to be checked. By the technically simple means of at least partly reflectorizing side surfaces parallel planar to the longitudinal axis of the measuring cell, it is therefore achieved that the additional angle transmitters so far required for determining the rotary table position or the predetermined steering angle may be omitted, whereby the whole measuring apparatus is further simplified. When the measuring cells provided with the above mentioned double-slit stop and lateral mirror surfaces are used, no other angle detectors are required for measuring all wheel angles as well as for the position control of the measuring heads.

In opto-electronic measuring sensors, usually the problem occurs that the light receiving elements react not only to the light beams of the light emitting elements but at the same time to the surrounding or ambient light, for example, the day light or the workshop illumination, which renders the evaluation of the received light values considerably complicated.

According to another aspect of the invention, the influence of the surrounding light is eliminated by a special processing of the received light data, and simultaneously the intensity of the output signals of the light receiving elements used is increased, so that accurate and informative measurements may also be effected at relatively intensively illuminated measuring locations. The influence of the surrounding light is eliminated by a first measuring operation with the light emitting elements turned off, in which only the surrounding light is eliminated by a first measuring operation with the light emitting elements turned off, in which only the surrounding light is received by the light receiving elements. The image obtained then is stored and subtracted from the image obtained in a succeeding measuring operation with the light emitting elements turned on. For obtaining sufficiently intensive measuring signals, according to the invention, the light emitting elements are activated with a predetermined phase, the light beam emitted at every pulse being received by the corresponding receiving element. As the difference level between two successive light beams is too small for an unambiguous evaluation at a high pulsing speed and the resulting short illumination time, according to the invention, as many individual images are added as required to obtain a sufficient signal intensity to be processed in the computer or processing means.

According to an advantageous embodiment of the invention, the light sources, for example, on the left front side and afterwards on the right rear side, are switched on, respectively. Thus it can be prevented that the receiving elements are illuminated by the light emitting elements on the same side either directly or indirectly by reflection. Further, the light intensity should be asynchronous to the net frequency or its period durations, to enable filtering undesired influences by light from other artificial light sources. Furthermore, an optical filter may be provided in front of the line generating element, i.e., in front of the slit stop, the permeability range of which filter is adjusted to the wave length of the corresponding light source. As light receiving elements, several lines of low-cost CCD line sensors are preferred, if necessary, which are supplied with pixel and image pulses by programmable logic device (PLD) components. An electro-optical evaluation system, in which several difference images or difference characteristics are amplified by adding, may also be used in wheel measuring systems without position control of the respective measuring heads.

To determine the king pin inclination, the inclination of the steering knuckle pivot, and the axle pin rake, according to the invention, two inclination sensors per measuring head being displaced by 90° with respect to each other may also be used. For decreasing the costs, according to a suitable embodiment of the invention, a single sensor may also be used, which sensor is turned by 90° to both measuring positions by a motor. By a further rotation by an additional 90°, a zero point adjustment or compensation may advantageously be effected. Suitably, the rotation of the sensor or its holding device is effected by means of a stepping motor, the number of steps of which is proportional to the turning angle of the sensor.

To be able to measure motor vehicles with excessively long front spoilers without problems, according to the invention, the measuring arms provided on the respective measuring heads are formed telescopic or adjustable in length and are aligned in a transverse direction with respect to the pitch axis of the vehicle, so that the measuring elements provided on its end are maintained in the space formed between the pavement and the front wheel. A further advantage of this arrangement is that in the case of a failure of the position control, for example, due to an interruption of the current supply, an empty battery or the like, the arms are automatically retracted due to a ground contact of their free ends, and therefore damage to the measuring head and also the measuring element provided on the end are prevented. During the driving operation to determine the eccentricity the measuring arms may be retracted, so that, even if smaller vehicle wheels are to be measured, their ends do not protrude beyond the tire circumference.

In a further suitable embodiment of the invention, the data transmission between the measuring heads and the control transmission may be effected via a radio transmission terminal, respectively, so that the measuring heads can communicate with each other even without a direct optical interconnection. The data transmission from one measuring head to another can either be effected via the radio transmission terminal (wireless) of the control means or directly between the measuring heads with equal frequencies in a time multiplex operation or using two oscillators with duplex operation (simultaneous transmission and receiving).

BRIEF DESCRIPTION OF THE DRAWING

The objects, advantages and features of the invention will be more readily appreciated from the following detailed description, when taken with reference to accompanying drawing, wherein:

FIG. 4 is a schematic view of two interacting electro-optical measuring cells applicable for the measuring heads;

FIG. 5 shows two optional electro-optical measuring cell embodiments for measuring the track and the king pin inclination used in the measuring heads;

FIG. 6 shows two further electro-optical measuring cells for measuring the angles of the track and the king pin inclination, and the steering angle;

DETAILED DESCRIPTION OF THE PREFERRED EMBODIMENTS

Figure 1:
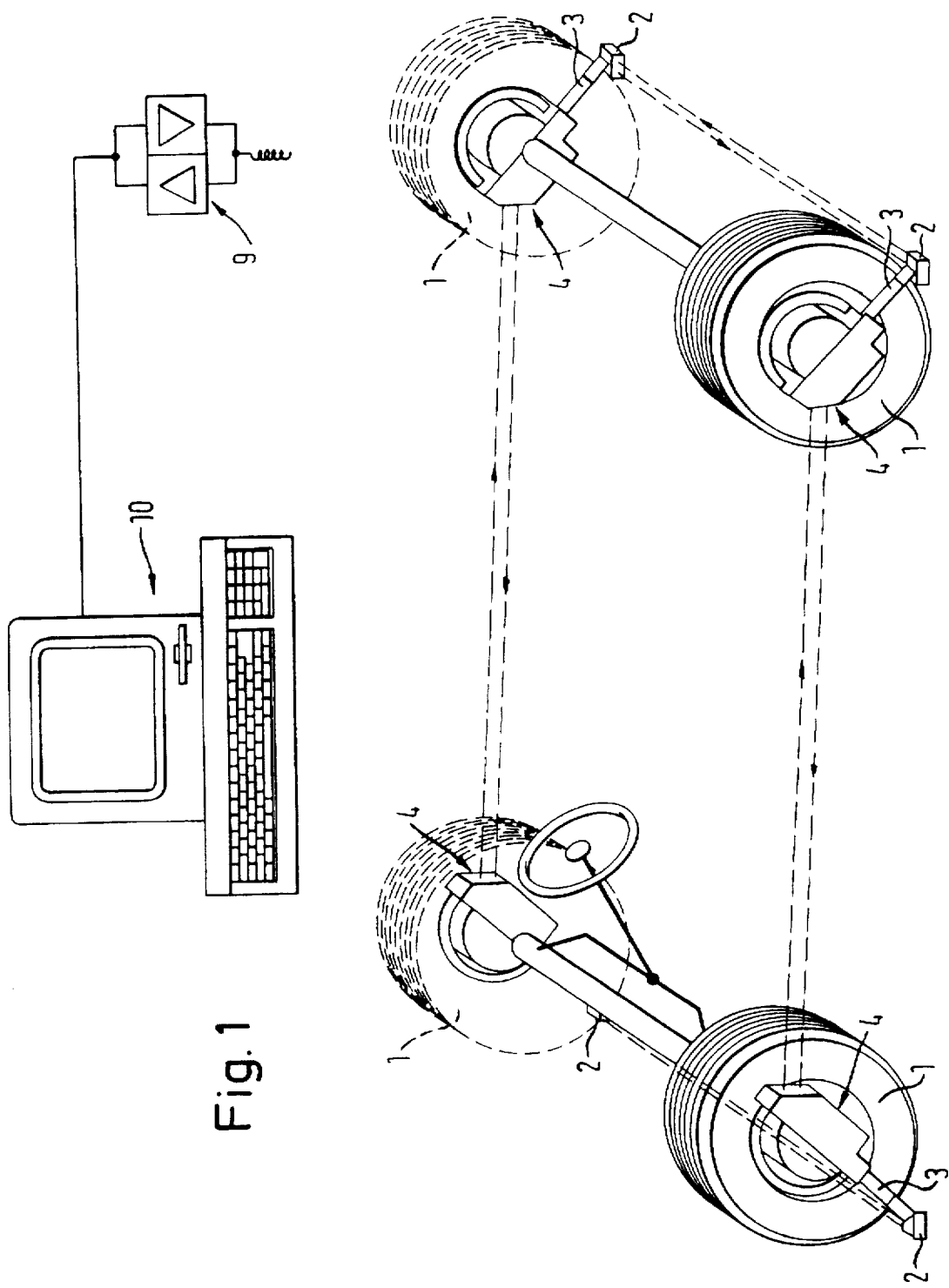
FIG. 1 is a schematic view of the chassis of a double-track motor vehicle provided with one measuring device per vehicle wheel and one stationary control means.

As may be understood from FIG. 1, on each wheel 1 of a two axle vehicle a measuring device is mounted, respectively, by means of an adjustable holding device being mechanically clamped or mounted on the outside of each wheel rim.

Figure 2:
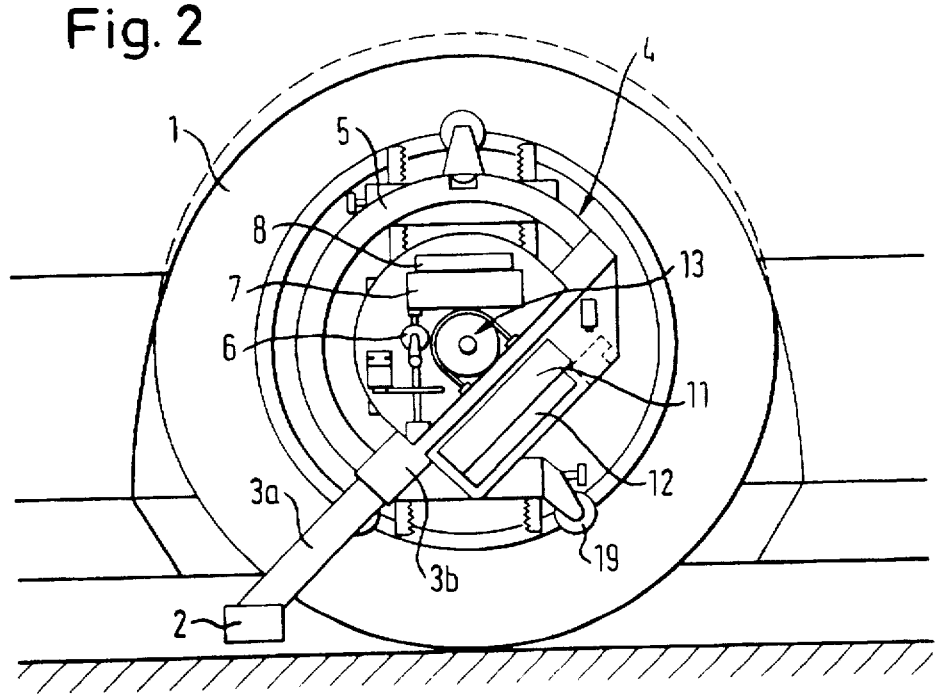
FIG. 2 is a schematic side elevation of a measuring device mounted on a vehicle wheel.

Each of the measuring devices shown in FIGS. 1 to 3 as embodiments further includes measuring head 4 provided with angle sensor, for example, an inclinometer, as well as at least one electro-optical measuring cell 2 being fixed to measuring arm 3 which is downwardly inclined at about 45°. As will be described in detail below, according to this embodiment the horizontal angles for the determination of the track are measured by measuring cells 2, and the vertical angles for determining the king pin inclination, the eccentricity, the inclination of the steering knuckle pivot and the axle pin rake are measured by the inclinometers, the inclinometer also serving as measuring value transmitter for the position control of the respective measuring head 4 described below.

As will be understood, particularly from FIG. 2, measuring arms 3 each consist of two telescopically movable parts 3a, 3b, retractable part 3a facing outward and supporting measuring cell 2. The other or tube part 3b is fixed to measuring head 4. By a releasable fixing device comprising, if necessary, a measuring scale, the two arm parts 3a, 3b can be adjusted so that measuring cell 2 obtains the most suitable position shown in FIG. 2 even with vehicle wheels 1 of different sizes.

According to the embodiment of FIG. 2, the actual measuring head 4 is surrounded by semicircular bow 5 fixed to the end portion of tube part 3b. In a housing of measuring head 4, is pendulum inclinometer 6, which will be described in detail with reference to FIGS. 9 and 10, second electro-optical measuring cell 7, radio transmission terminal 8 for the data communication with processor (control and processing unit) 10 shown in FIG. 1 via receiving equipment 9 and, in the lower portion, current supply 11 including allocated control unit 12.

Figure 3A:
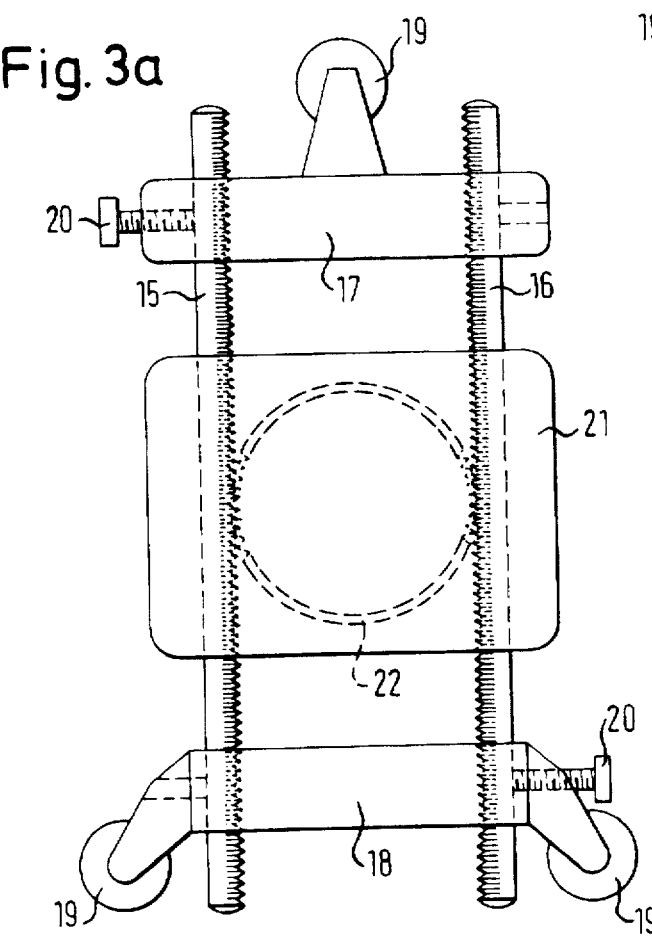
FIGS. 3a and 3b are a side elevation and a partially sectional vertical view of the holding device of the measuring device.
Figure 3B:
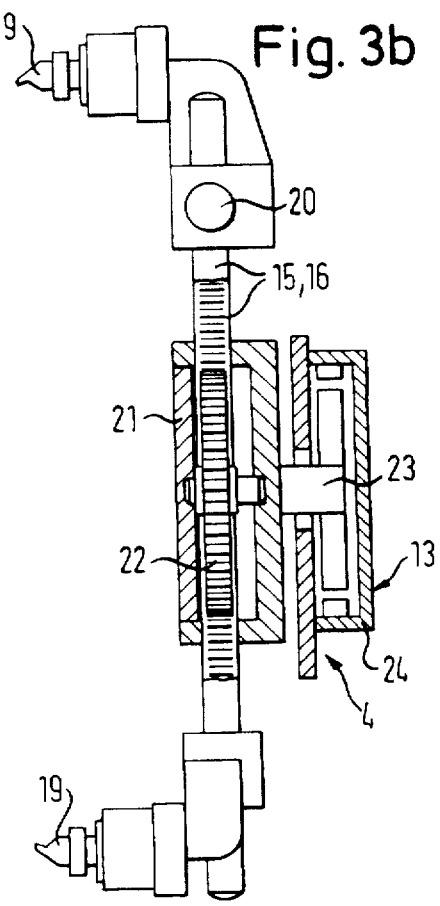

Holding device 14 for a measuring head as shown in FIGS. 3a and 3b comprises two parallel steering racks 15, 16 connected to each other by two transverse bars 17, 18 at their end portions. Transverse bar 17 comprises central chucking element 19 and lateral fixing bolt 20. Lower transverse bar 18 comprises two lateral chucking elements 19 and a similar fixing bolt 20. In housing 21 gear 22 is rotatably mounted, which gear engages with the gearing of steering racks 15, 16. Motor shaft 23 of servomotor 13 is fixedly mounted on housing 21 in alignment with the rotary axis of the gear, which servomotor may be a stepping motor or a dynamically suitable dc motor comprising an allocated increment transmitter, housing 24 of which forms a part of the measuring head. As holding device 14 on the outside of the respective wheel rim is mounted on the wheel rim edge by rotating gear 22 and by a clamping engagement of the three chucking elements 19 so that the axis of gear 22 and with it the motor shaft 23 are aligned with the wheel axis as accurately as possible. The holding device is clamped to the wheel rim and is taken along when the vehicle wheel is rotated. Inclinometer 6 provided in measuring head 4 detects even small angle changes of the measuring head position, which are processed by control unit 12 and converted to control signals for servomotor 13. The servomotor drives measuring head 4 with a rotating speed identical to the rotating speed of the vehicle wheel, while the rotating direction is opposed to that of the vehicle wheel. The activation increments of servomotor 13 are electronically stored in the control unit so that the complete rotary motion of the vehicle wheel being rotated during the measuring operation, for example, to determine the so called eccentricity, as well as its position at any time, can be determined therefrom. In this manner, measuring head 4 is held in its illustrated measuring and spatial position independent of the amount of the respective rotating speed of the vehicle wheel. According to FIGS. 3a, 3b, servomotor 13 drives measuring head 4 directly, that is, without intermediate reduction. To be able to use smaller servomotors, a gearing (gears, belts or the like) may be employed.

In practice, it is generally inevitable that alignment or displacement errors, or both, occur between the axles of vehicle wheel 1 and servomotor 13, for example, due to an inaccurate adjustment or also a wheel rim eccentricity. In this case, a deviation changing cyclically with the rotation of the wheel is generated when the vehicle wheel is rotated and measuring head 4 is counterrotated. This deviation is referred to as an eccentricity. For detecting and compensating this deviation or eccentricity, another inclinometer according to the embodiment shown in FIG. 9 may be provided in the measuring head, which inclinometer detects angle variations with respect to the vertical longitudinal plane during a full rotation of the wheel. Instead of this inclinometer a different inclination sensor, preferably of electro-optical construction, may be used.

Figure 10:
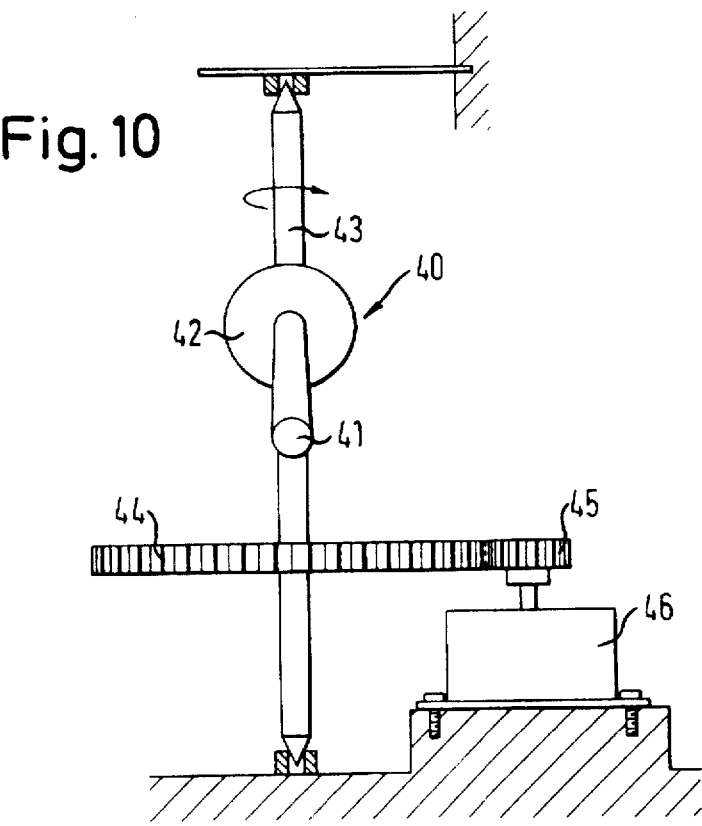
FIG. 10 shows alternative embodiment of an inclinometer with rotary drive usable in a measuring head of the invention.

Alternatively, a single inclinometer according to the embodiment of FIG. 10 may be provided, which inclinometer may be turned to predetermined positions by means of a servomotor.

In FIG. 4, two electro-optical measuring sensors or measuring cells are shown. These may be used in measuring head 4 designed according to the invention as measuring cell 2 on the free end of telescopic arm 3 and as measuring cell 7 on the inside of the measuring head. As may be understood from the dotted lines in FIG. 1, one measuring cell according to FIG. 4 is provided in the measuring head of one vehicle wheel, and the other measuring cell is provided in the measuring head of another vehicle wheel, respectively. Each measuring cell contains a light emitting element, such as directed light source 26 in the form of, for example, an LED, a laser, or the like, the light beam of which, indicated by arrows, are emitted in the direction of a slit stop 27 provided in the front end portion of the other measuring cell. Filter 28 may be allocated to each slit stop 27, which filter is permeable only for light having a predetermined wave length. Further, in each measuring cell a light receiving element, preferably in the form of CCD line sensors 29 is provided, the single elements of which are activated by the strip-like light beam emerging from the respective slit stop 27 and filter 28. Suitably, the activation of the LED's is effected in a pulsed way to be able to filter at least a part of the detrimental surrounding or ambient light. In an inclined position of either one of the measuring sensors deviating from the relative position shown, the light mark shown in the center in FIG. 4 moves to the one or the other side while the distance of the light mark from the center line is proportional to the relative inclined position of the two measuring sensors and provides the datum base line for the processing and display of the measuring data.

Figure 7A:
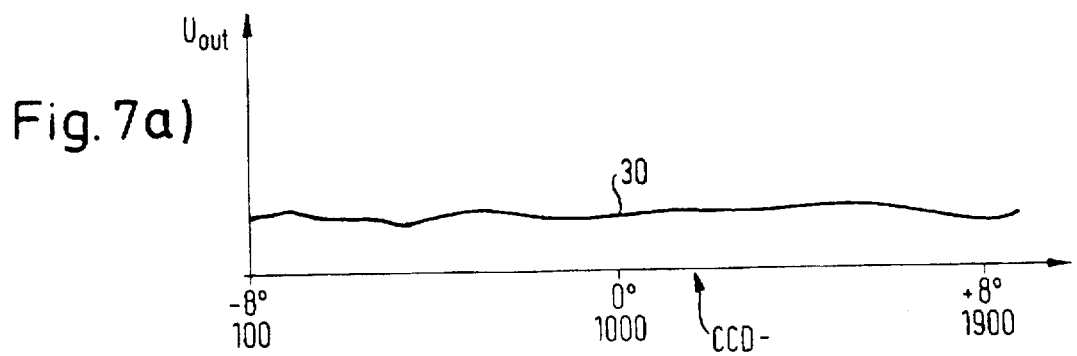
FIGS. 7a, 7b, 7c and 7d show characteristics of the processing of output signals of the measuring sensors for elimination of the ambient light and for obtaining amplified output signals.
Figure 7B:
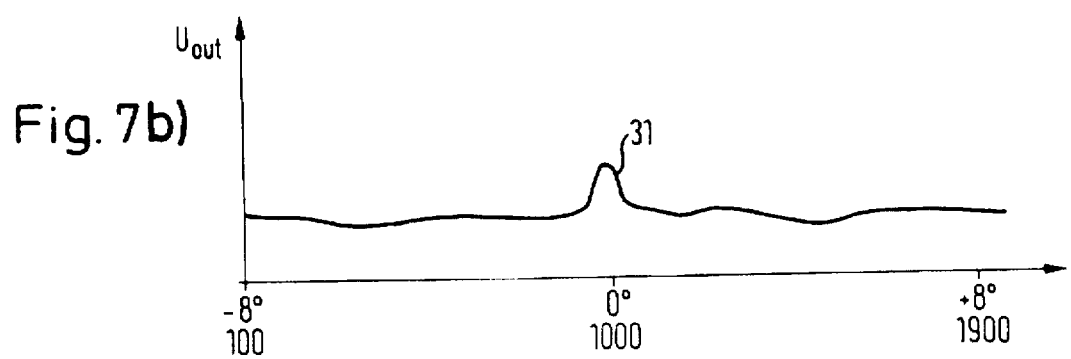
Figure 7C:
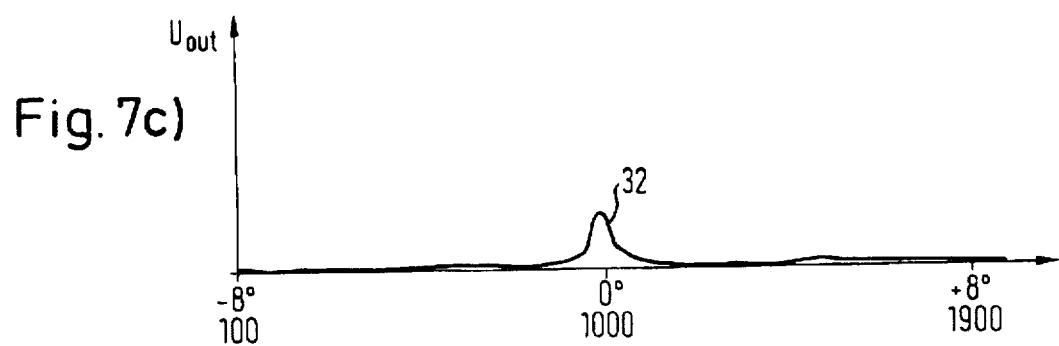
Figure 7D:
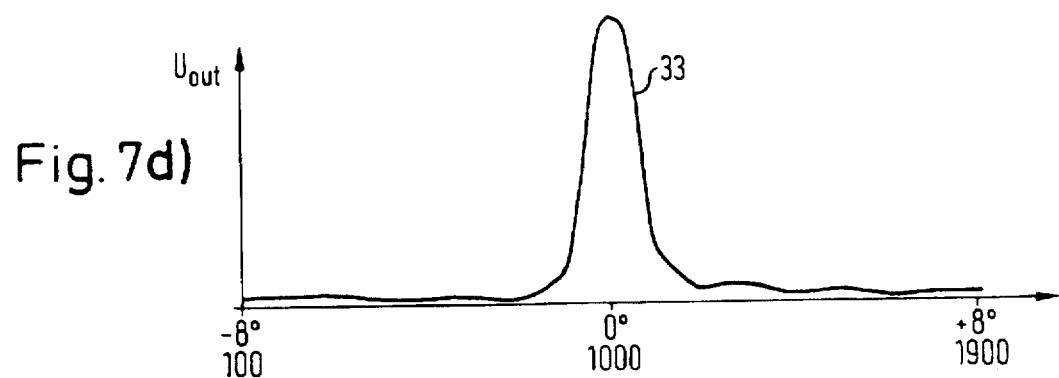

As in a strongly illuminated environment, such as in daylight, the damping of the surrounding light by pulsed activation of light emitting elements 26 alone is insufficient, and an overdrive of light sensing elements 29 may occur. According to the invention, the detrimental influences caused by ambient light are eliminated as shown in FIG. 7. Before a measuring operation is carried out, the level of the external light in the receiving element (CCD line sensor 29), is measured with the light emitting element turned off, thus forming the base characteristic 30 shown in FIG. 7a. Then, an angle measurement is effected by activating the light emitting element 26 to obtain responsive signal 31 of FIG. 7b, of which base line 30 of FIG. 7a is subtracted to obtain signal spike 32 of FIG. 7c. As can be seen, this characteristic has a suddenly increased signal level U only in an area of 0°, in this case. The values of consequently detected characteristics or difference images are now added until the characteristic 33 of FIG. 7d, having a readily delectably high signal level in the area of 0°, is obtained. Thus, the output signals supplied to the computer or processor have a sufficiently high voltage for further processing. In case of a lateral displacement of the light line of FIG. 4, a corresponding lateral displacement of the increased signal level of FIG. 7d is effected.

The CCD line sensors used are supplied with a pixel and image pulse by a programmable logic device (PLD). At the output portion of the CCD line sensor, a voltage or a current is available per pixel pulse which is proportional to the illumination condition of the respective light receiving element.

The design of measuring sensors or measuring cells 2, 7 shown in FIG. 5, substantially corresponds to the embodiment of the measuring cell according to FIG. 4, which is expressed by the usage of corresponding numerals for corresponding components. Measuring cells 2, 7 of FIG. 5, however, considerably differ from the embodiment of FIG. 4 with respect to its function as it enables the measurement of the king pin inclination and track angles in a simple way without other components. To this end, each slit stop has two line-forming elements in the form of slits 27a, 27b, which are arranged in a V-shape in the illustrated embodiment. Between the two slits 27a and 27b, a light generator is provided, which may be constituted of one or more light emitting elements 26 according to FIG. 4. This light emitting element generates the timed or pulsed directed light beams for illuminating the corresponding measuring sensor on the mating measuring head. Due to the inclined position of two slits 27a and 27b of the slit stop, the two V-shaped projection images are formed on the rear wall of the measuring cell housing on which a line shaped light receiving element 29 is provided.

Figure 8A:
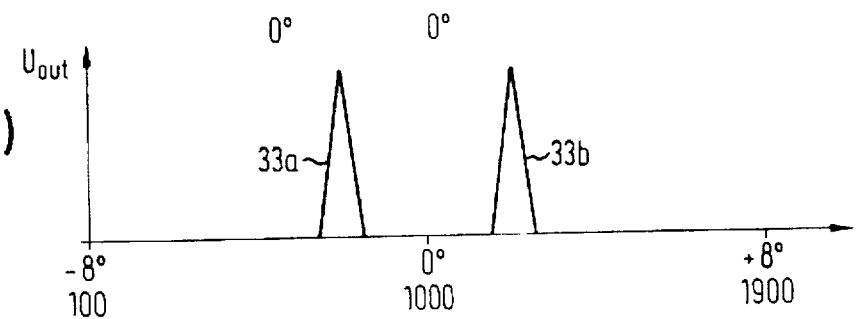
FIGS. 8a, 8b, 8c and 8d depict characteristics of the output signals of the measuring sensor according to FIG. 5.
Figure 8B:
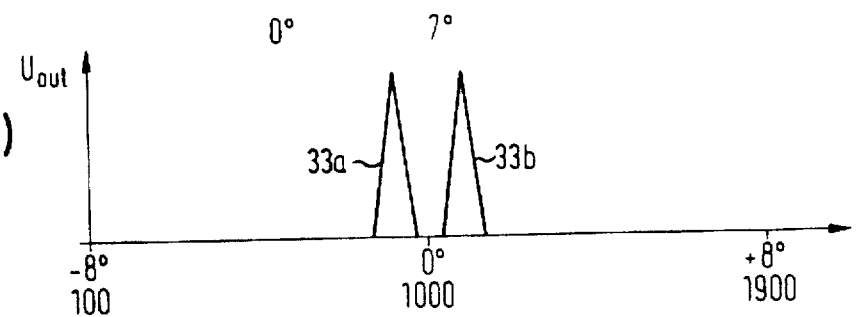
Figure 8C:
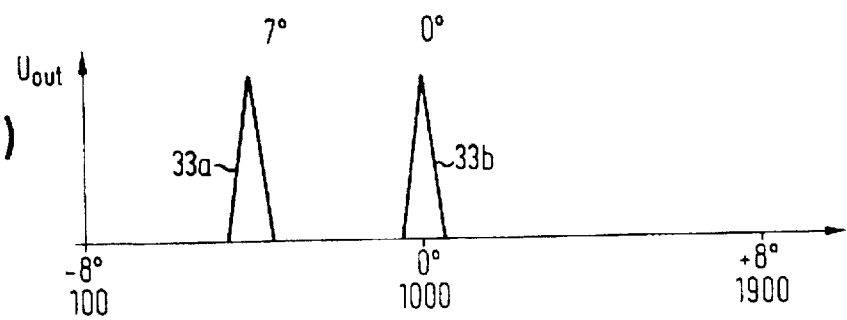
Figure 8D:
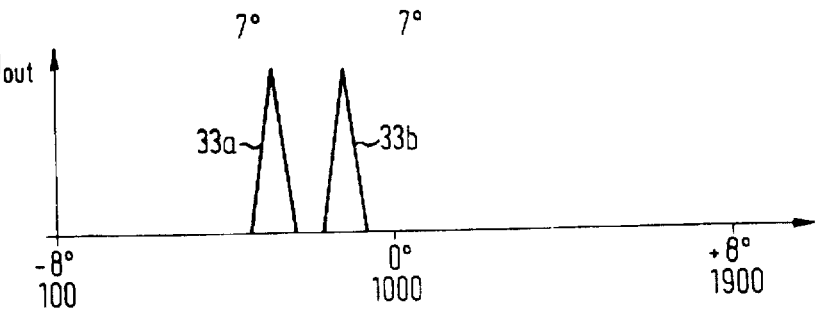

The operation of measuring cells 2, 7 shown in FIG. 5 is described in the following with reference to the graphs shown in FIG. 8. The suppression of the influences of ambient light explained above with reference to FIG. 7 is realized also in this case, so that the two schematic pointed cones 33a, 33b shown in FIGS. 8a to 8d correspond to the signal level of signal 33 shown in FIG. 7d. Each of the two pointed cones 33a and 33b is generated by one of the two slits 27a and 27b of the slit stop, respectively. If the track angle and also angle of the king pin inclination are 0°, the illumination of light receiving elements 29 in FIG. 5 and the position of the two pointed cones 33a, 33b in FIG. 8a are given. If measuring sensors 2, 7 are relatively turned against each other in the horizontal plane, which would correspond to a track angle, the V-shaped projection image shown in FIG. 5 moves to the left side or to the right side. Then the two points of intersection of the V-shaped legs and the sensor line 29 remain unchanged in distance, and the position of the pointed cones 33a, 33b shown in FIG. 8c is obtained. In case of an exclusively vertical relative movement of the measuring sensors 2, 7 corresponding to the angle of the king pin inclination, the V-shaped projection image shown in FIG. 5 is moved up or down, which leads to a change of the distance of the points of intersection of the image and the sensor line without a lateral movement. The position of the two pointed cones 33a, 33b in this case is shown in FIG. 8b. From the lateral displacement and the simultaneous change of the distance of the two pointed cones 33a, 33b according to the illustration of FIG. 8d, it can be derived that for the first time the track angle and the angle of the king pin inclination can be measured simultaneously by the measuring sensors according to FIG. 5, which means a considerable simplification and acceleration of the complete measuring operation. Of course, angles having commonly or alternatingly negative values may also be measured.

By means of the angle of the V-shaped slits 27a, 27b of the slit stop or their height, the measuring range, and with it the sensor resolution, may be determined from the relationship to the sensor distance. Preferably, a light receiving line comprising 2048 or 5000 pixels is used, and the V-shaped slit stop is selected so that half of the sensor range is available for the track or king pin inclination angle measurement, respectively, with about ±8° each. By a suitable selection of the angle, however, the sensor part may as well be unequal. If, for example, a higher resolution is desired for the track, this may be realized at the expense of the resolution of the king pin inclination. For this purpose, for example, the V-angle of the slit stop is decreased, whereby the distances between the signal peaks shown in FIG. 8a are decreased. This additional range of the sensor may either be utilized for an increased measuring range, for example, about ±10°, or a higher resolution may be obtained with the same measuring range by increasing the distance from the slit stop to the sensor. Finally, with these measuring cells, the measuring data for the position control of measuring heads 4 may also be obtained with the vehicle wheels rotating, for example, to determine the eccentricity from the distance between pointed cones 33a, 33b.

In addition to the detection of the track angle and the angle of the king pin inclination, a wheel and axle measurement of motor vehicle wheels also comprises, among other things, the determination of the maximum steering angle of the wheels steered, of the track difference angle, of the inclination of the steering knuckle pivot and of the axle pin rake. For measuring the latter angles, supporting plates for the wheels to be measured are required, which plates are borne freely shiftable and freely rotatable in the horizontal plane. The determination of the track difference angle of the inclination, the steering knuckle pivot and the axle pin rake is effected with a steering angle of about ±20°, respectively, which is set by turning the supporting plate.

The measurement or adjustment of the steering angle may be effected in a simple manner, according to the invention, by using the measuring sensors shown in FIG. 6 which correspond to the embodiments according to FIGS. 4 or 5 in their design. As shown in FIG. 6, mirrors 65 are provided on the side walls of the respective sensor housing, which mirrors 65 reflect the incident light beams—which are indicated by broken lines—within a predetermined horizontal inclination area from, for example, about 12° to about 28°, so that image signals are generated in the light receiving line 29. In this way, the steering angles, that is, the wheel angles, may be directly detected at a steering angle of, for example, about ±20°. The light beams incident in an angle range of, for example, ±12° to 28°, are reflected by the planar parallel mirrors 65a, 65b on the two side walls of the housing and received by the corresponding light receiving elements in line sensor 29. The embodiment according to FIG. 6 operates in the angle range of, for example, about ±8°, like the measuring sensor according to FIG. 5 for detecting the track angles and the angles of the king pin inclination. This embodiment additionally enables the above-mentioned adjustments of the steering angles as well as the determination of the inclination of the steering knuckle pivot, the axle pin rake and the like. The horizontally inclined position of the two measuring sensors 2, 7 shown in FIG. 6 corresponds to a preselected maximum steering angle of about 28°. It is understood that, at a preselected minimum steering angle of about 12°—the light beams of which are illustrated as well by the broken line +12°—the horizontally inclined position of the two measuring sensors 2, 7 is correspondingly smaller.

With measuring sensors 2, 7 shown in FIG. 6, all angles important for the driving geometry of a motor vehicle are detected by means of a single high resolution linear receiving line 29 (CCD sensor). By using the slit stop comprising the two slits 27a and 27b arranged in a V-shape, the track angle and, perpendicular to the same, the angle of the king pin inclination, are measured. At a steering angle of about ±20°, the respective track signal is detected via the respectively effective mirror surface 65a or 65b, and the track difference angle is derived from the difference of the two track signals. The inclination of the steering knuckle pivot and the axle pin rake are calculated as follows from the king pin inclination signals displaced by 90° at this steering angle of 20°:

$$\tau = \tan^{-1}\frac{\sin\gamma_{Ni} - \sin\gamma_{Na}}{\sin\delta_a - \sin\delta_i} \quad \text{(Eq. 1)}$$

$$\sigma = \tan^{-1}\frac{\sin\gamma_{Si} - \sin\gamma_{Sa}}{\sin\delta_a - \sin\delta_i} \quad \text{(Eq. 2)}$$

where:

τ=steering knuckle pivot

σ=axle pin rake

δ=steering angle $\gamma_N$=angle of the steering knuckle pivot transmitter $\gamma_S$=angle of the axle pin rake transmitter i,a=Index, i=inner side of the curve, a=outer side of the curve The above-mentioned steering knuckle pivot transmitter and axle pin rake transmitter are formed by measuring sensors 7 (FIG. 2) measuring the angle between the front axle and the rear axle as well as measuring sensors 2 (transverse track sensors) of FIGS. 1 and 2.

The electro-optical measuring sensors or measuring cells 2, 7 described above, and the operation principle for stray light suppression according to FIG. 7, may also be used in other devices for measuring vehicle wheels or axles.

Figure 9:
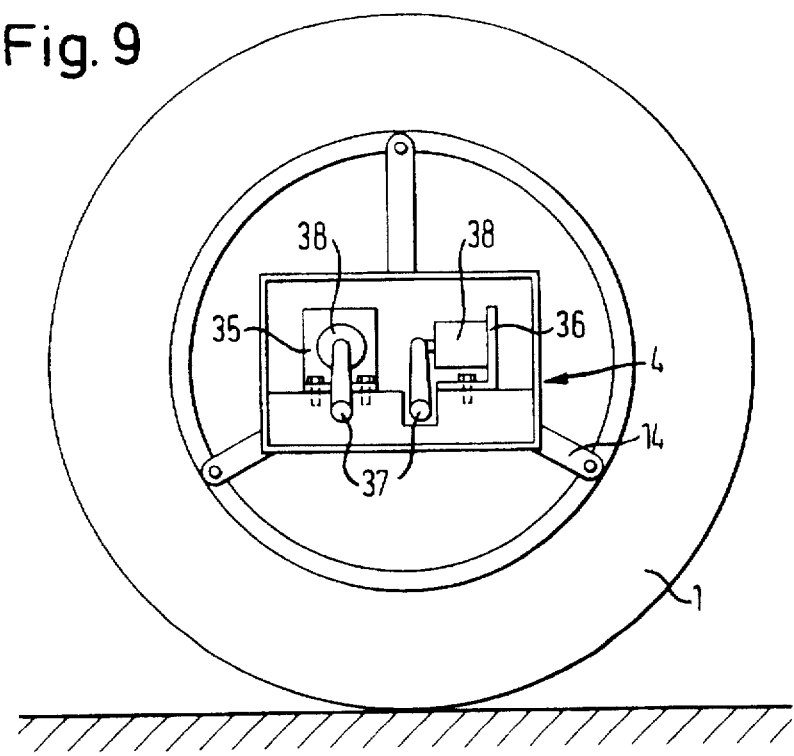
FIG. 9 is a schematic side elevation of an arrangement of two pendulum inclinometers in a measuring head usable in the invention.

Measuring head 4 of FIG. 9 is fixedly mounted to the outside of a wheel rim by means of three beam holding device 14. Two inclinometers 35, 36 are arranged in a condition in which they are displaced against each other by 90°. Each of these inclinometers is provided with a weight pendulum 37 borne freely pivotable around a horizontal axis and an angle transmitter fixedly mounted on the measuring head, which is electrically connected to control unit 12 (FIG. 2) via appropriate connections (not shown). In this embodiment, inclinometer 35 supplies the measuring signals for the position control of measuring head 4, while inclinometer 36 serves for measuring, for example, the angle of the king pin inclination and the eccentricity.

In the measuring head schematically shown in FIG. 10, which may also be used, for example, in the apparatus of FIGS. 1 and 2, only a single inclinometer 40 having weight pendulum 41 and angle transmitter 42 is used, and is fixed to axle 43 borne on its tips. On this rotating axle 43, gear 44 is provided which is engaged with pinion 45 driven by a dc motor or stepping motor 46. By means of this motor, inclinometer 40 may be rotated to predetermined positions, for example, by 90° or 180°, so that the values for the position control as well as for the king pin inclination and eccentricity detection can be obtained with only one inclinometer 40. In addition, by rotating inclinometer 40 by 180°, the possibility of a zero point adjustment is given. If, for example, the king pin inclination is +5°, and inclinometer 40 has a zero point error of +1°, on the output of the inclinometer a signal of +6° exists. After rotating the inclinometer by 180° a signal of +4° exists on the output side. The mean value of the two measurements is the king pin inclination signal of +5° with the error eliminated. Instead of the inclinometer comprising pendulum weights 37, 41 shown in FIGS. 9, 10, other types of inclinometers, particularly electro-optical inclinometers, may be used.

Figure 11:
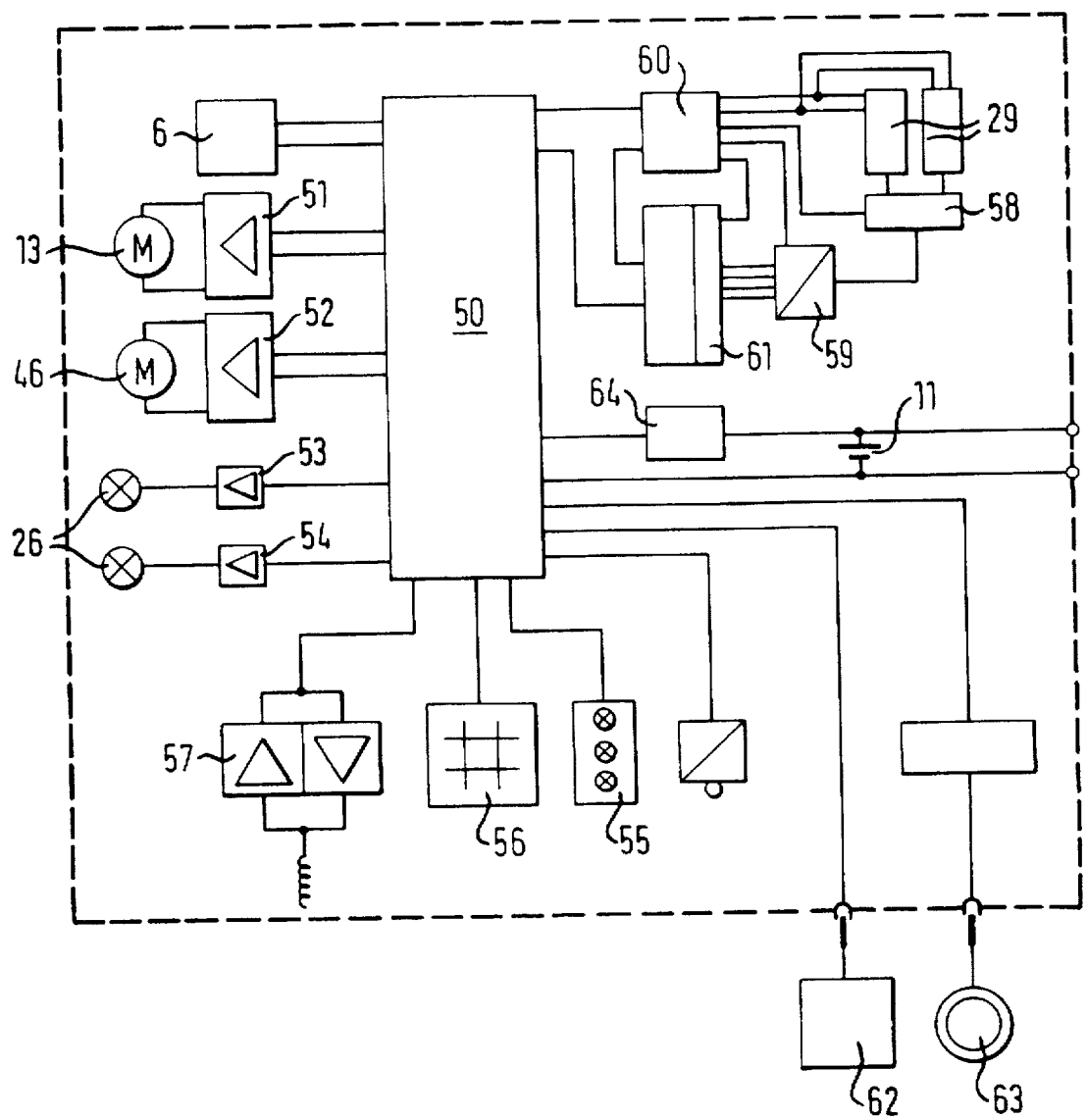
FIG. 11 is a circuit diagram of the control unit of the invention.

The control circuit shown in FIG. 11 is a component of control unit 12 shown in FIG. 2. The dc motor or stepping motor 13 for the position control and also the dc motor or stepping motor 46 (FIG. 10) for the rotation of inclinometer 40 are accessed by microprocessor 50 via respective driver 51, 52. Likewise, light sources 26 of measuring cells 2, 7 are accessed by the microprocessor via clock switches 53, 54. The output signals of the electro-optical measuring sensors according to FIGS. 4 to 6 or of the inclinometer 6 (or 35, 36 or 40 according to FIGS. 9 and 10) are supplied to microprocessor 50. Further, the circuit arrangement contains status display 55 of the measuring head connected to the microprocessor, key board 56 for the manual operation, as well as radio transmission terminal 57 through which the output signals of the microprocessor can be transmitted to the control unit 10 (FIG. 1). Line sensors 29 of measuring cells 2 and 7 of each measuring head 4 are connected to an analog/digital converter 59 via a multiplexer 58 for selecting the respective CCD sensors as well as to programmable logic device component (PLD) 60 controlling CCD sensors 29, multiplexer 58, and A/D converter 59 as well as video RAMs 61. PLD 60 and the video RAM consisting of a serial portion and a parallel portion are connected to microprocessor 50 via a data bus. Between accumulator 11 and microprocessor 50 voltage regulator 62 is inserted. Further, reference inclinometer 63 as well as rotating angle detector 64 provided on a floatingly borne rotary table for measuring a steering angle may be connected to the microprocessor in a contact free relation.

The invention is not limited to the illustrated embodiments. Thus, components or groups of components may be used in angle measuring devices separately or in other combinations than the one described. Particularly, when the electro-optical measuring cells according to FIGS. 5 and 6 are used, the mechanically relatively sensitive pendulum inclinometers as well as, if necessary, the rotary table angle transmitters may be omitted. Further, a testing stand provided with the measuring device according to the invention may comprise plates shiftable perpendicularly to the driving direction, and at least one light barrier activated by the motor vehicle driven onto it, after the activation of which the measurements are effected while the vehicle is driven across the shiftable plates.

It is therefore a major object of the invention to provide methods and devices for measuring the wheel and axle positions of double-track motor vehicles, by means of which the relevant wheel angles, such as the track, the king pin inclination, the eccentricity and the like are detected by measuring heads mounted on the wheel rims of the vehicle wheels and evaluated and displayed by an electronic processing means for the measuring data. To be able to effect the measuring operation, particularly the detection of the eccentricity, even for a vehicle standing on a pavement or on pairs of rollers, according to the invention, the measuring head of each vehicle wheel is held in its predetermined measuring and spatial position, with the vehicle wheels being rotationally driven while the motor vehicle is contacting the pavement or the pair of rollers, which is effected by a rotatable bearing of the measuring head and a rotary drive having the same driving speed as the corresponding vehicle wheel, however, in the opposite direction.

In addition, a sensor for the king pin inclination and the inclination of the steering knuckle pivot is suggested, which sensor is rotatably borne and can measure, by being rotated, for example, by 90°, the king pin inclination or the axle pin rake and the inclination of the steering knuckle pivot by means of a single sensor. Furthermore, by an additional rotation by a further 180°, a compensation of the offset error inherent to the sensor is enabled.

It is another object of the invention that a single high resolution linear CCD sensor being illuminated by a V-shaped slit stop so that the track angle as well as the angle of the king pin inclination may be calculated from the sensor signal is used instead of the measurement of the king pin inclination by means of inclinometers.

According to another embodiment of the invention, parts of the side walls of the sensor housing are made reflective so that the light beam passing the slit stop is incident on the same position of the sensor element in a relatively inclined position of two measuring heads of ±20° as at 0°. Due to this possibility, the usage of an angle transmitter in the supporting plate for the wheel may be omitted. Suitably, the relationship of the distance between slit stop 27 and measuring sensor 29 of each of measuring cells 2, 7 and the distance b of the center of the measuring cell to the reflective surface 65a or 65b should be selected so that the pairs of angles demanded by the manufacturer of the motor vehicle are preferably about 20° or about 10°. The desired angle (tan β) is here obtained as:

$$\tan\beta = 2 \cdot b : a \qquad \text{(Eq. 3)}$$

What is claimed is:

1. A method for measuring the wheel positions of double-track motor vehicles, the method comprising the steps of:

detecting the relevant wheel angles, such as the track, the king pin inclination, the inclination of the steering knuckle pivot, the axle pin rake, the eccentricity and the like by means of measuring heads mounted on the wheel rims of the vehicle wheels, each measuring head being pivotable around the extension of the axis of rotation of the respectively related vehicle wheel;

coupling the measuring data of the wheel positions from said detecting step to processing means;

evaluating and displaying the measuring data by the processing means; and holding the measuring heads in their predetermined measuring positions when the vehicle wheels are rotationally driven by means of a position control.

2. The method recited in claim 1, wherein the individual measuring heads are driven with the same rotation speed as the respectively allocated vehicle wheels during the measuring operation but in the opposite direction.

3. The method recited in either claim 1 or 2, and comprising the further steps of:

detecting and comparing the actual value of the position of the measuring head with the corresponding target values during the rotation of the respective vehicle wheel; and controlling the counterrotation of the measuring head so that the deviation between the actual value and the target value is maintained near zero.

4. The method recited in either claim 1 or 2, wherein the measurements are carried out on the vehicle being driven on the pavement at a predetermined speed.

5. The method recited in either claim 1 or 2, wherein the measurements are carried out on rotationally driven pairs of rollers.

6. The method recited in either claim 1 or 2, wherein the measurements are effected while the vehicle is driven over a shiftable plate shiftable perpendicular to the driving direction with an activation of the measuring operation being effected by crossing a light barrier.

7. The method recited in either claim 1 or 2, wherein the measuring data from the measuring heads are coupled to the processing means by means of wireless transmission.

8. The method recited in either claim 1 or 2, wherein:

the measurement of the position of a vehicle wheel is effected electro-optically using two position controlled measuring heads, a line detector of one of the measuring heads being intermittently illuminated by a light source of the other oppositely pointed measuring head; and calibrating the measuring heads for ambient light by first measuring the light intensity in a first measuring operation with the light source turned off and then in a second measuring operation with the light source activated, the measuring data obtained with the light source turned off being subtracted from the measuring data obtained with the light source turned on, and the difference images obtained with the light source turned on and off being added until the signal used has a sufficient intensity for further processing.

9. An apparatus for measuring the wheel positions of double-track motor vehicles, the apparatus comprising:

a measuring head for each wheel of the vehicle to provide measuring data therefor;

a holding device mounted on each wheel for holding said measuring head pivotable around an extension of the wheel axle, said measuring head being provided with angle sensors for detecting the wheel positions;

processing means for the evaluation and display of the measuring data;

means for coupling the measuring data to said processing means; and position control means allocated to the measuring head, to maintain the measuring position of said measuring head during the measuring operation with the vehicle wheel rotating.

10. The apparatus recited in claim 9, wherein said position control means comprise drive means which rotates said measuring head with the same rotating speed as the vehicle wheel but in the opposite direction, as well as inclination sensors in the form of inclinometers, electro-optical angle sensors and a control unit.

11. The apparatus recited in claim 10, wherein said drive means is a stepping motor or a dc motor including an increment transmitter.

12. The apparatus recited in claim 10, wherein the inclination sensors related to the control unit comprise pendulums freely movable around an axis.

13. The apparatus recited in claim 10, wherein each measuring head comprises two angle sensors, each of which consists of a light source, a slit stop and a line sensor, said angle sensor of one of said measuring heads cooperating with a second said angle sensor in an opposed said measuring head, said light source of one of said angle sensors projecting a light mark on said line sensor of said second angle sensor.

14. Apparatus for measuring the wheel position of a double-track motor vehicle, the apparatus comprising:
measuring head pivotable around the axis of rotation of the respective related wheel and mounted on each of the vehicle wheels for detecting the relevant wheel angles, such as the track, the king pin inclination, the inclination of the steering knuckle pivot, the axle pin rake, each said measuring head comprising:
inclination sensor means;
a position control means;
processing means for preparing or processing the measuring heads;
a single pivotable inclination sensor comprising first a measuring position for measuring the inclination of the steering knuckle pivot and the axle pin rate, a second measuring position respectively displaced by 180° for an offset compensation of the previous measuring position; and
a motor for pivoting said inclination sensor.

15. The apparatus recited in claim 14, wherein said pivoting motor is a stepping motor, the amount of steps of which is proportional to the angle of rotation of the sensor.

16. The apparatus recited in claim 14, wherein said motor is a dc driven gear motor comprising a flanged potentiometer for determining the sensor position while the target position obtained by said processing means is adjusted through a downstream servo amplifier.

17. The apparatus recited in any one of claims 9 to 14, wherein said position control means comprises:
a servomotor for said measuring head;
an axis centered tappet; and
a motor housing connected to said measuring head.

18. The apparatus recited in any one of claims 9 to 14, wherein said measuring head is coupled to said position control means via a reverse gear.

19. The apparatus recited in any one of claims 9 to 14, and further comprising a length adjustable measuring arm mounted on said measuring head in a predetermined inclined position with respect to the horizontal plane, said measuring arm being provided with an electro-optical sensor at its free end, said measuring arm being fixable in predetermined extended positions.

20. Apparatus for measuring the wheel position of a double-track motor vehicle, said apparatus comprising:
a measuring head pivotable around the axis of rotation of the respective related wheel and mounted on each vehicle wheel for detecting the relevant wheel angles, such as the track, the king
pin inclination, the inclination of the steering knuckle pivot, and the axle pin rake, each said measuring head providing measuring signals and comprising:
two electro-optical measuring cells each including a light source, a slit stop spaced from said slit stop and a line sensor; and
processing means for the measuring signals;
said the slit stop comprising at least two slits in a predetermined local relation for generating at least two corresponding light marks on said line sensor, the position of the light marks corresponding to the track angle and the distance of the two light marks corresponding to the angle of the king pin inclination in a reference system.

21. The apparatus recited in claim 20, wherein said slit stop comprises two slits arranged in a V-shape.

22. The apparatus recited in claim 21, wherein said V-shape of the slits of said slit stop is designed so that a track of about 8° as well as a king pin inclination of about 8° can be measured with said line sensor comprising a linear CCD sensor, and said light source is positioned between said two V-shaped legs.

23. The apparatus recited in claim 20, wherein said measuring cell is between said slit stop and said line sensor and is provided with lateral, parallel, planer mirror surfaces.

24. The apparatus recited in claim 23, wherein said measuring cell comprises a housing on the side walls of which said planar parallel mirror surfaces are provided.

25. The apparatus recited in either claim 23 or 24, wherein the distance between said slit stop and said line sensor is selected so that the measuring range is repeated at a steering angle of about ±20°, so that a track angle of about ±8° and additionally an angle of about −12° to about +28° can be measured.

* * * * *